US008763213B2

(12) United States Patent
Burdett et al.

(10) Patent No.: US 8,763,213 B2
(45) Date of Patent: Jul. 1, 2014

(54) DEFORMABLE LATCH FOR TIE-DOWN HOOKS

(75) Inventors: Richard Felix Burdett, Spencer, MA (US); James Joseph Laney, North Brookfield, MA (US)

(73) Assignee: JES Management, LLC, North Brookfield, MA (US)

( * ) Notice: Subject to any disclaimer, the term of this patent is extended or adjusted under 35 U.S.C. 154(b) by 204 days.

(21) Appl. No.: 13/196,266

(22) Filed: Aug. 2, 2011

(65) Prior Publication Data

US 2012/0192385 A1 Aug. 2, 2012

Related U.S. Application Data

(60) Provisional application No. 61/462,111, filed on Jan. 31, 2011.

(51) Int. Cl.
*B65D 63/10* (2006.01)
*F16B 1/00* (2006.01)

(52) U.S. Cl.
USPC ............. 24/369; 24/300; 24/598.7; 24/598.4; 24/373; 294/82.17

(58) Field of Classification Search
CPC .. B60P 7/0823; B65D 63/1027; B65D 63/10; A01G 17/12; A47G 25/32
USPC ............. 24/369, 16 PB, 17 AP, 17 R, 30.5 S, 24/30.5 P, 373, 598.7, 598.4, 600.9, 716, 24/712.9, 200, 130; 223/85, 88; D6/328; 248/340; 294/82.17
See application file for complete search history.

(56) References Cited

U.S. PATENT DOCUMENTS

| 1,639,226 | A | * | 8/1927 | Haines | 24/200 |
|---|---|---|---|---|---|
| 2,877,941 | A | * | 3/1959 | Melone | 223/88 |
| 3,438,095 | A | * | 4/1969 | Evans | 24/16 PB |
| 4,646,396 | A | | 3/1987 | Geese | |
| 5,692,268 | A | * | 12/1997 | Case | 24/16 PB |
| 5,884,368 | A | * | 3/1999 | Boe | 24/16 PB |
| 6,487,760 | B1 | * | 12/2002 | Larsen | 24/598.7 |
| 2004/0261235 | A1 | * | 12/2004 | Funk | 24/712.9 |
| 2005/0251967 | A1 | * | 11/2005 | McNeill | 24/16 PB |
| 2009/0241296 | A1 | * | 10/2009 | Sorensen | 24/130 |

OTHER PUBLICATIONS

Superior Motorcycle Products, Hot Pink Two Hook Universal Watercraft Tie-Down (0122), http://cgi.ebay.com/ebaymotors/eBayISAPI.dll?ViewItem&_trksid+...240&viewitem=&trkparms=clkid%3D2751092651379447906#ht_1494wt_941, pp. 1-3, Ebay.

* cited by examiner

*Primary Examiner* — Robert J Sandy
*Assistant Examiner* — Michael Lee
(74) *Attorney, Agent, or Firm* — McCormick, Paulding & Huber LLP

(57) ABSTRACT

A retaining latch or strap for use with tie-down hooks has an elastically deformable body, which includes a first sidewall and a second sidewall. The sidewalls are joined together at first and second ends, and are spaced apart by a strut extending transversely between them to define first and second hook openings. The latch may include a handle extending from one end of the body.

7 Claims, 6 Drawing Sheets

DEFORMABLE LATCH FOR TIE-DOWN HOOKS

CROSS REFERENCE TO RELATED APPLICATIONS

The present application is a non-provisional of U.S. Patent Application Ser. No. 61/462,111 filed on Jan. 31, 2011, hereby incorporated herein by reference.

FIELD OF THE INVENTION

The present invention relates to load tie-downs, and, more particularly, to hooks for use with tie-downs.

BACKGROUND OF THE INVENTION

Tie-downs, or fabric straps with hooks attached to each end, commonly are used for fastening movable loads onto fixed or moving structures. For example, tie-downs can be used to secure a lawnmower or motorcycle onto a trailer or into the bed of a pickup truck. Each hook is engaged with or into an attachment structure connected with the trailer platform or the pickup bed. Rings and cleats are designed attachment structures for engaging tie down hooks. Other informal attachment structures such as rails, notches, and indentations, and even the edges of a trailer platform also may be used when a ring or a cleat is not convenient.

Particularly during the process of fastening a load onto a trailer, it is possible for the hook of a tie-down to disengage from the attachment structure. Often this happens as a user moves around the trailer to engage the other hook of the tie-down at the far side of the trailer. The result is that the user must go back and re-engage the first hook. For particularly awkward loads, re-engagement may be required more than once for more than one hook.

Tie-down hooks sometimes have been provided with permanently attached bails or latches, often spring loaded, that cause the hooks to "clip" onto a ring or cleat. Such spring loaded latches limit the range of attachment structure with which a hook may be used. In particular there can be a tendency for a spring loaded latch to shove its hook off of an informal attachment structure such as a trailer edge.

Accordingly, it is desirable to have a tie-down hook include a latch or some other retaining structure that can hold the hook in place while a tie-down is being attached, but that does not detract from engaging the hook onto an informal structure.

SUMMARY OF THE INVENTION

According to the present invention, a deformable retaining latch or strap is formed in a single piece from an elastomeric material for use with tie-down hooks. The inventive retaining latch includes a latch body with two sidewalls that are integrally joined and spaced apart by a central pillar or strut extending between mid points of the sidewalls. The two sidewalls and the central pillar define two hook openings in the latch body. In some embodiments, the latch may also include a handle joined to the body by a neck, with a head or thumb tab at the end of the neck distal from the body. In some embodiments, the head can be provided with grooves or ridges to enhance grippability.

In use, the latch body is stretched to slide a first of the two hook openings onto a tip, around a curved belly, and onto a shank of a tie-down hook. The tip of the tie-down hook then is engaged into a ring or a sling that is fastened to a load. The latch body then is stretched further to slide the second of the two hook openings onto the tip of the tie-down hook, thereby capturing the ring or sling onto the belly of the tie-down hook. The strut of the latch assists in holding open the first hook opening and the second hook opening as the latch body is stretched for fitting each opening onto the tip of the tie-down hook.

In select embodiments, the two hook openings are generally triangular in shape, and each hook opening has a radiused corner where the two sidewalls of the latch body join together opposite the strut. Triangular shape of the hook opening can enhance gripping action of the sidewalls against the hook, when the latch body has been stretched to get the hook opening over the tip of the hook. Additionally, the radiused corner helps to hold open the hook opening for easier insertion of the hook tip.

In other embodiments, an elastically deformable retaining strap or latch is provided for use with tie down hooks. The strap has a body, which defines two hook openings spaced apart by a length of elastically deformable material between them. The hook openings may be generally triangular in shape. They may be arranged substantially equidistant from a midpoint of the length of the strap. The strap may include a gripping handle.

In some embodiments, the deformable retaining latch is brightly colored for ease of visual observation. For example, the deformable retaining latch may have any of a "safety yellow" color or a "safety orange" color substantially as established by ANSI.

These and other objects, features and advantages of the present invention will become apparent in light of the detailed description of the best mode embodiment thereof, as illustrated in the accompanying drawings.

DESCRIPTION OF PREFERRED EMBODIMENTS

Figure 1:
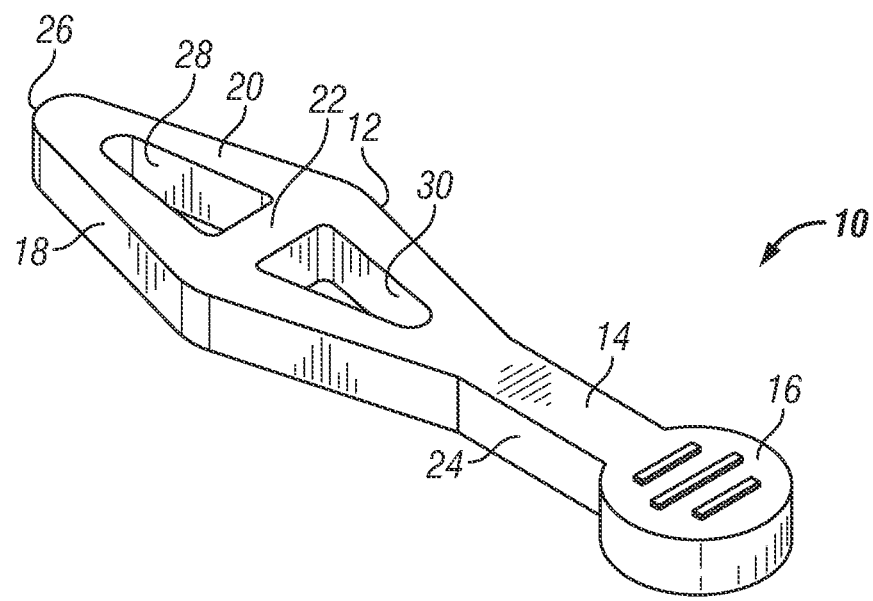
FIG. 1 shows in perspective view a deformable retaining latch according to an embodiment of the present invention.

Referring to FIG. 1, a deformable retaining strap or latch 10, for use with tie-down hooks, includes a body 12 from which a handle neck 14 extends to a head 16. The body includes two sidewalls 18, 20 that are spaced apart by a central pillar or strut 22. The strut is integrally joined with each sidewall at about the midpoint of the sidewall. The sidewalls are integrally joined to each other at their ends 24 proximal to and contiguous with the neck and at their ends 26 distal from the neck. The sidewalls together with the strut define through-holes or hook openings 28, 30 that are generally triangular in shape and that are respectively disposed distal from and proximal to the neck.

The neck of the handle 14 is generally rectangular in section and is integrally formed with the body 12. In some embodiments, the neck has a square section. The head 16 is shown as circular in shape, and of uniform thickness with the neck and body. In some embodiments the head can include a gripping surface, i.e. ridges or grooves as shown. The head can be of different shapes than circular.

Figure 2:
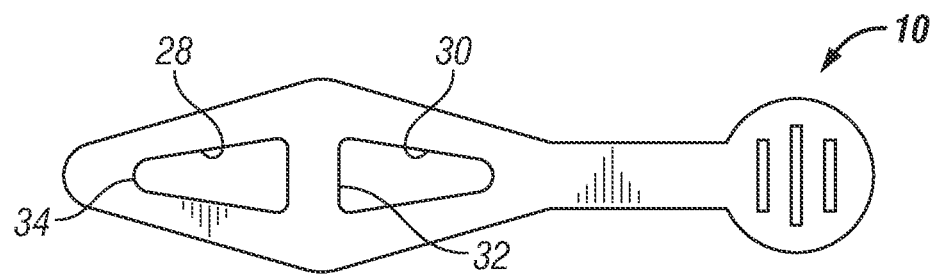
FIG. 2 shows in plan view a deformable retaining latch according to an embodiment of the present invention.

FIG. 2 shows that each of the hook openings 28 or 30 has a generally flat or planar base 32 formed by the strut 22 and has a rounded tip, corner, or crown 34 pointing away from the strut. When the deformable latch 10 is stretched lengthwise, as further discussed below, the hook openings do not tend to close. Instead, the strut and the radiused corners of the hook openings cooperate to hold the stretched hook openings open for receiving a tip of a tie-down hook. Additionally, the triangular shape of each hook opening provides a wedging action of the latch sidewalls 18, 20 against a shank of a tie-down hook that is inserted through the opening.

Deformable retaining latches, according to various embodiments of the present invention, may be made from any rigid and elastically deformable material, and may be of any color. In some embodiments, deformable latches according to the invention are made from EPDM (ethylene-propylene diene monomer) elastomer of about 60 Shore A durometer hardness. In other embodiments, latches are made from TPR or thermoplastic rubber of similar hardness. Either EPDM or TPR can be designed to provide desirable combinations of toughness, elasticity, working strain, yield stress, and friction. In select embodiments, deformable retaining latches according to the invention are colored "safety yellow" or "safety orange" according to ANSI guidelines.

Figure 3:
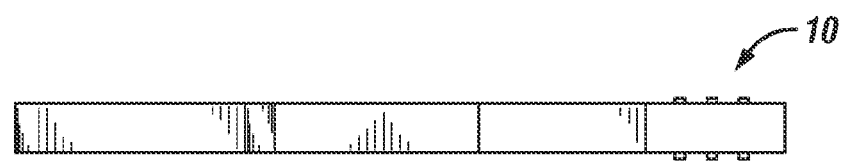
FIG. 3 shows in elevation view a deformable retaining latch according to an embodiment of the present invention.
Figure 5:
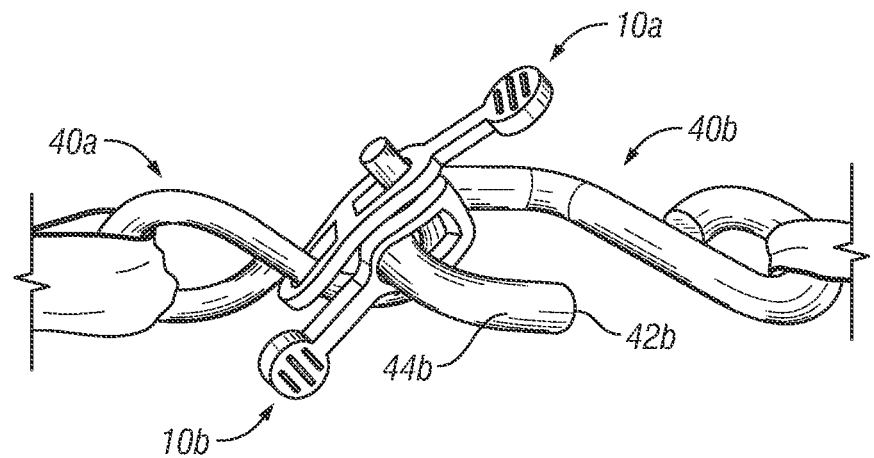
FIG. 5 shows in perspective view two deformable retaining latches, according to embodiments of the present invention, in use with two tie-down hooks, according to another aspect of the present invention.
Figure 6:
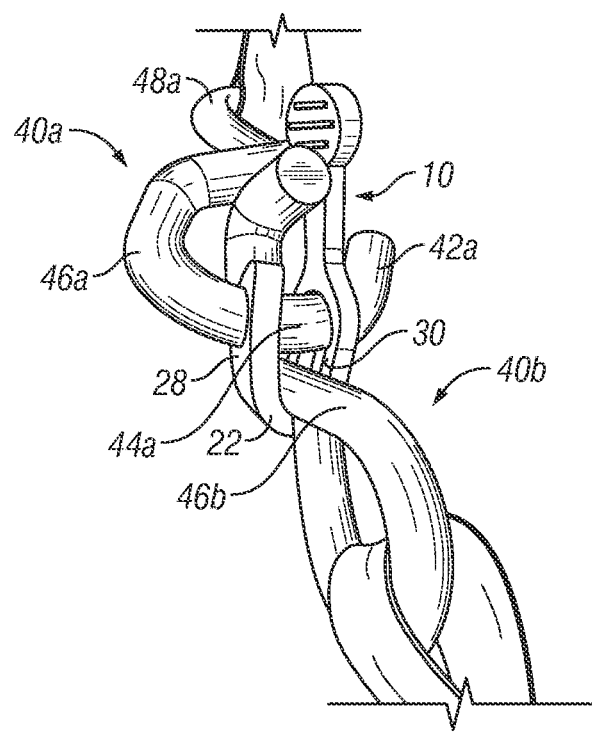
FIG. 6 shows in perspective view a single deformable retaining latch, according to an embodiment of the present invention, in use with two tie-down hooks, according to yet another aspect of the present invention.

As shown in FIGS. 2 and 3, in some embodiments of the invention a deformable retaining latch 10 may be about 3/16" thick with the hook openings 28, being about 5/16" across their bases and about 9/16" base to tip. The strut may be about 3/16" thick. The hook opening tips may be radiused at about 1/16". These dimensions are deemed satisfactory for use with 3/8" tie-down hooks, as shown in FIGS. 4-6.

Dimensions have been specified for one preferred embodiment. Other dimensions will be apparent to those of skill, based on rated continuous or impact loads of the hook. It is desirable to maintain the deformable latch as a manually-operable device, while at the same time avoiding rupture of the latch while stretched to go over an S-hook. Variations in material properties and dimensions may therefore be required for larger-sized embodiments of the invention.

Figure 4:
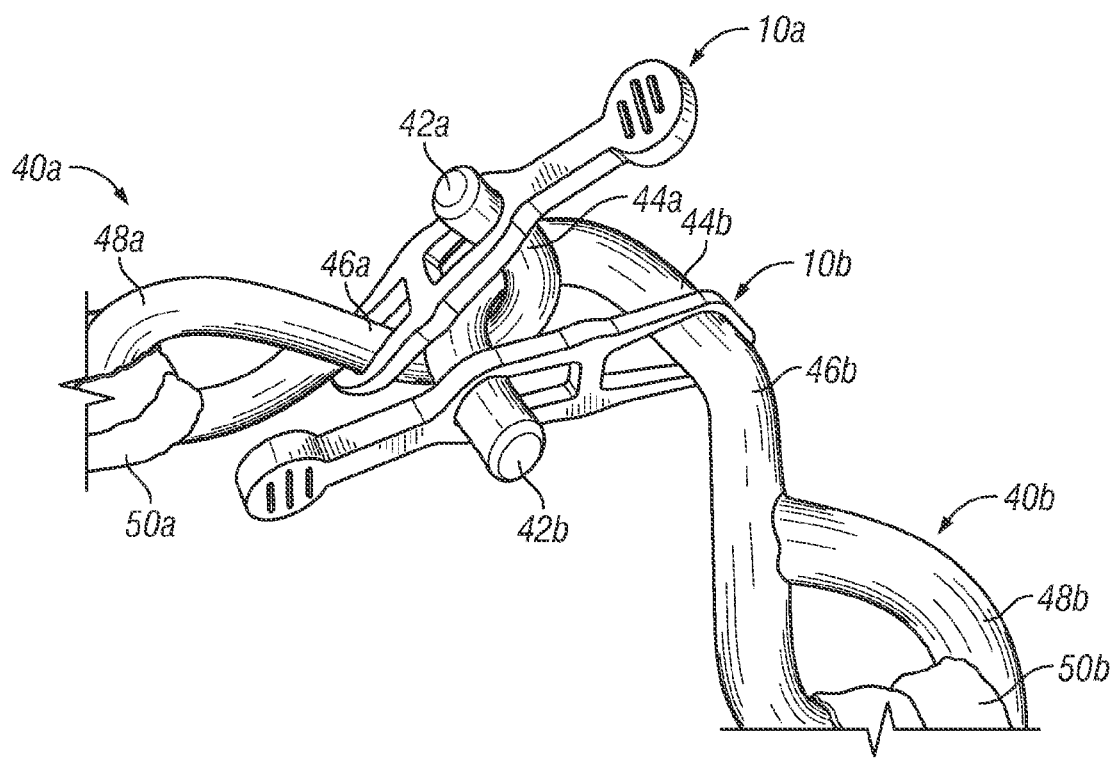
FIG. 4 shows in perspective view two deformable retaining latches, according to embodiments of the present invention, in use with two tie-down hooks, according to one aspect of the present invention.

Referring to FIG. 4, two tie-down hooks 40a, 40b are shown. Each tie-down hook has a tip 42, a belly 44, a shank 46, and a ring 48 to which is secured a sling 50. First and second retaining latches 10a, 10b may be respectively assembled together with the first and second tie-down hooks 40a, 40b, according generally to the following procedure:

Gripping the head 16a of the first latch 10a, a user stretches the distal hook opening 28a of the first latch to fit over the tip 42a of the first hook 40a. The user then slides the latch body 12a along the curved belly 44a of the first hook until the distal opening grips the shank 46a of the first hook. Similarly, the distal hook opening 28b of the second latch 10b can be positioned on the shank 46b of the second tie-down hook 40b. The belly 44b of the second tie-down hook then is engaged with the belly of the first tie-down hook.

Again gripping the head 16a of the first latch 10a, the user stretches the proximal hook opening 30a of the first latch over the tip 42a of the first hook 40a to capture the second hook 40b in the first hook belly 44a. Similarly, the proximal hook opening 30b of the second latch 10b can be stretched over the tip 42b of the second hook to capture the first hook.

While the retaining device 10 has been described as containing a single, bifurcating central pillar or strut member 22, the present invention is not so limited in this regard as any number or configuration of struts are equally contemplated by the present invention, provided they space apart the sidewalls 18, 20 and prohibit the retaining device from falling off of the bight of an s-hook when engaged onto its shank and tip.

Also, although material may be conserved by providing only a single neck 14 and head 16, a neck and head may be provided at each end of an embodiment of the inventive or latch.

FIG. 5 shows that one or both of the retaining latches 10a, 10b may be "snugged down" to wrap around the juncture of the two hooks 40a, 40b, thereby mitigating sway or pendulum motion of the lower hook during lifting.

FIG. 6 shows that a single retaining latch 10 may be used in the "snugged" manner to secure together first and second tie-down hooks 40a, 40b.

Although two tie-down hooks have been used to show various aspects of using the deformable retaining latch, embodiments of the invention equally are usable for securing a single hook to a ring or cleat of a trailer or pickup bed.

Figure 7:
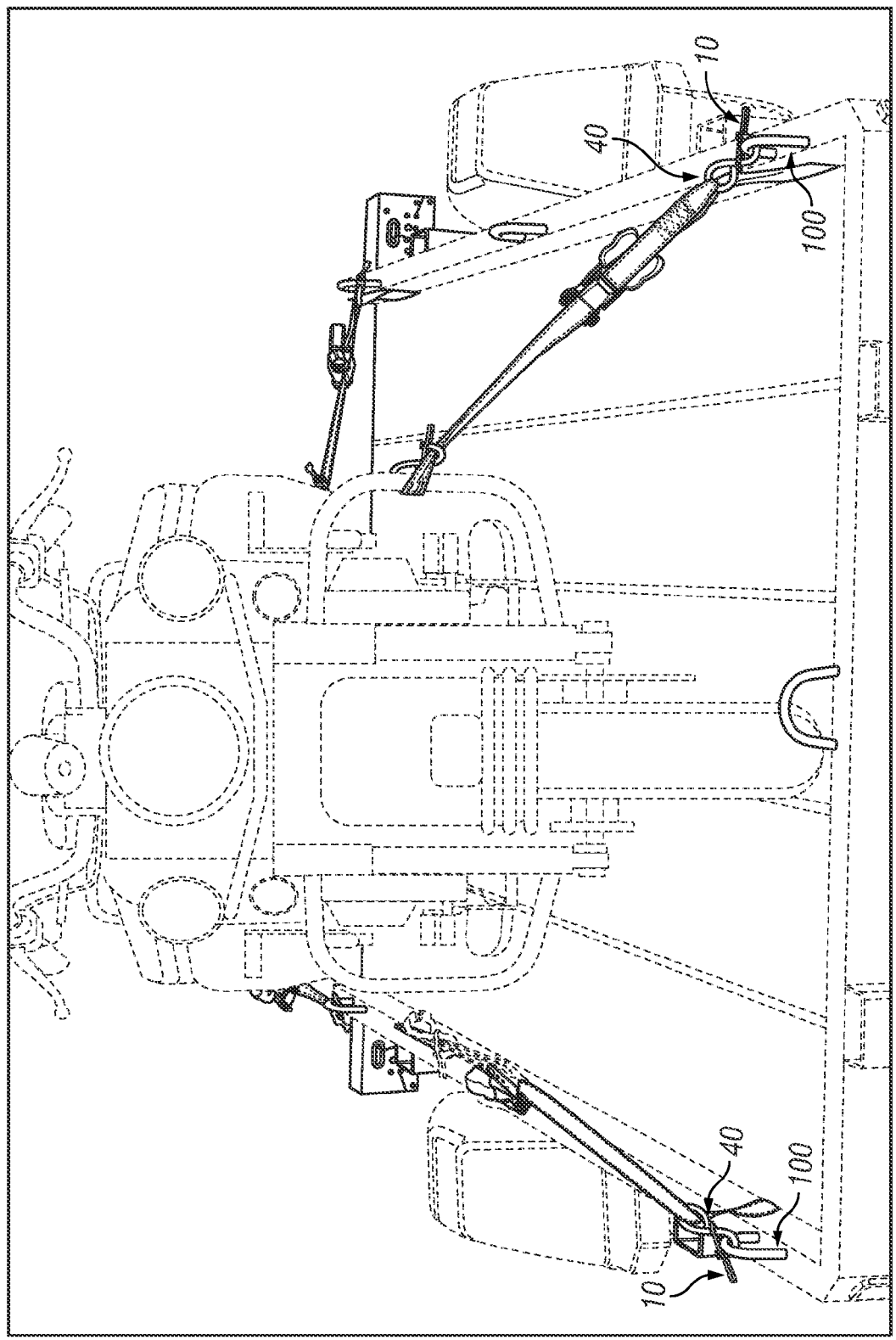
FIG. 7 shows in perspective view a plurality of tie-downs used with deformable retaining latches, according to an embodiment of the present invention, for strapping a motorcycle to a trailer.
Figure 8:
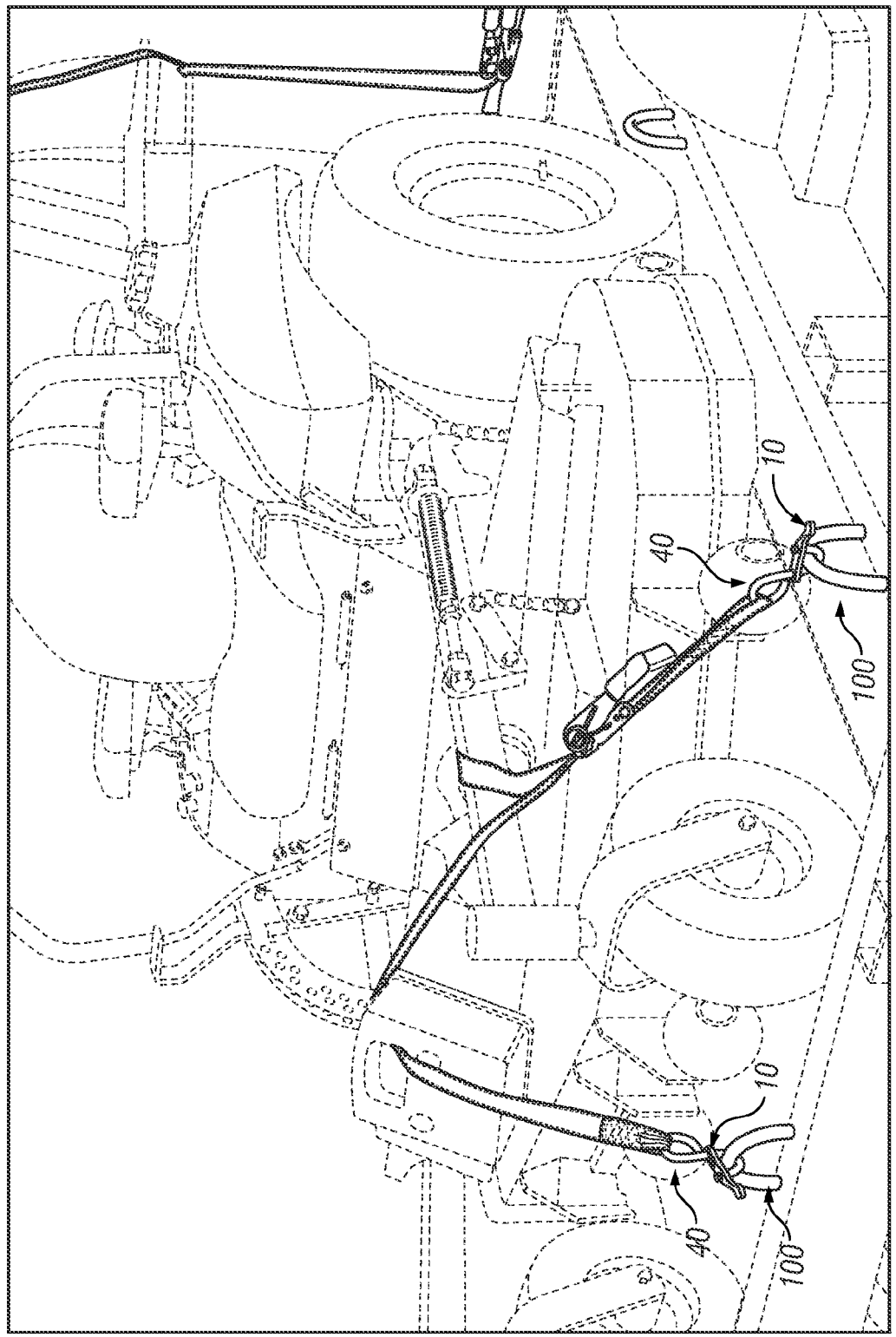
FIG. 8 shows in perspective view a plurality of tie-downs used with deformable retaining latches, according to an embodiment of the present invention, for strapping a mower to a trailer.

For example, FIG. 7 shows a plurality of retaining latches 10 in use with tie downs holding a motorcycle onto a trailer. Similarly, FIG. 8 shows a plurality of retaining latches in use with tie downs for holding a mower onto the trailer. As can be seen, the retaining latches are helpful for keeping the tie down hooks engaged with cleats or rings 100 on the trailer.

Figure 9:
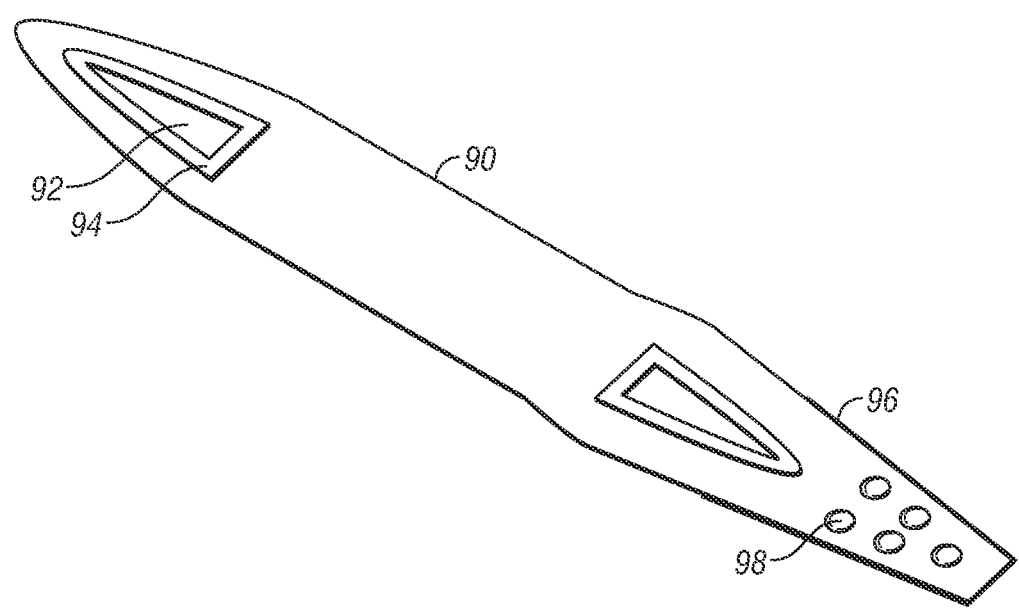
FIG. 9 shows in perspective view a deformable retaining latch according to another embodiment of the present invention.

FIG. 9 shows in perspective view another embodiment of the invention, in which a deformable retaining strap 90 is formed as a substantially flat sheet with two holes or hook openings 92 spaced about equidistant from a midpoint of the strap. Although the inventive strap is shown with triangular hook openings, surrounded by reinforcing ridges 94, both the triangular shapes and the ridges are optional. The handle 96, provided with gripping dimples 98, also is optional.

Further, although exemplary embodiments of this invention have been shown and described with respect to the appended drawings, it will be understood by those skilled in the art that various changes in form and detail thereof may be made without departing from the spirit and the scope of the invention.

What is claimed is:

1. An elastically deformable retaining latch for use with tie-down hooks, comprising:
  a body having a first sidewall and a second sidewall joined together at first and second ends, a periphery of said body defining a generally diamond shape,
  a neck integrally formed with and extending from said body, said neck being generally rectangular in shape,
  a head integrally formed with said neck and spaced from said body by said neck,
  a strut extending transversely between and spacing apart the first and second sidewalls, and
  a pair of first and second hook openings defined between the sidewalls and the strut; and wherein each of said first and second hook openings are generally triangular and has a generally planar base defined by opposing sides of said strut with a rounded tip opposing said base; and wherein said body, said neck and said head are substantially symmetrical about a longitudinal axis of said retaining latch.

2. A retaining latch as claimed in claim 1, wherein the strut is formed integrally with the sidewalls.

3. A retaining latch as claimed in claim 1, wherein the strut is disposed about midway between the proximal and distal ends of the sidewalls.

4. A retaining latch as claimed in claim 1, formed as a unitary body of TPR.

5. A retaining latch as claimed in claim 1, wherein said head includes a gripping surface having a plurality of ridges.

6. An elastically deformable retaining strap for use with tie down hooks, comprising:

a body defining an opposing pair of two hook openings spaced apart by a length of elastically deformable material between them, a periphery of said body defining a generally diamond shape;

a neck integrally formed with and extending from said body, said neck being generally rectangular in shape; and a head integrally formed with said neck and spaced from said body by said neck, said head being circular in shape and having a plurality of gripping ridges formed thereon;

wherein each hook opening is generally triangular and includes a planar base proximal to the other hook opening, said triangular pair of hook openings each having a rounded tip distal from said planar base; and wherein said body, said neck and said head are substantially symmetrical about a longitudinal axis of said retaining latch.

7. A retaining strap as claimed in claim 6, wherein the hook openings are substantially equidistant from a midpoint of the length of elastically deformable material.

\* \* \* \* \*